(12) United States Patent
Kogure et al.

(10) Patent No.: US 12,007,710 B2
(45) Date of Patent: Jun. 11, 2024

(54) IMAGE PROCESSING DEVICE

(71) Applicant: TOSHIBA TEC KABUSHIKI KAISHA, Tokyo (JP)

(72) Inventors: Kazunari Kogure, Kita Tokyo (JP); Satoru Ishihara, Koto Tokyo (JP); Hirokazu Watanabe, Minato Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/480,534

(22) Filed: Oct. 4, 2023

(65) Prior Publication Data

US 2024/0027946 A1  Jan. 25, 2024

Related U.S. Application Data

(62) Division of application No. 17/842,830, filed on Jun. 17, 2022, now Pat. No. 11,809,116.

(30) Foreign Application Priority Data

Jul. 5, 2021 (JP) .................................. 2021-111186

(51) Int. Cl.
*G06F 3/12* (2006.01)
*G03G 15/00* (2006.01)
(Continued)

(52) U.S. Cl.
CPC ........... *G03G 15/5041* (2013.01); *G06T 5/70* (2024.01); *H04N 1/409* (2013.01); *G06T 2207/10008* (2013.01)

(58) Field of Classification Search
None
See application file for complete search history.

(56) References Cited

U.S. PATENT DOCUMENTS 7,551,313 B2 *  6/2009  Kuroki ................. G06F 3/1208
                                                          358/404
8,194,999 B2     6/2012  Toyoda et al.
(Continued)

FOREIGN PATENT DOCUMENTS

JP  2010-103909   5/2010
JP  2012-119752   6/2012
(Continued)

OTHER PUBLICATIONS

U.S. Appl. No. 17/842,830, filed Jun. 17, 2022.

*Primary Examiner* — Dung D Tran
(74) *Attorney, Agent, or Firm* — Amin, Turocy & Watson, LLP

(57) ABSTRACT

According to one embodiment, an image processing device capable of removing a horizontal streak that may show when a document is scanned and made into a file is provided. An image processing device according to one embodiment includes: an image processing unit configured to generate smoothing image data obtained by applying smoothing to image data, and save, as an image file, non-smoothing image data in which smoothing is not applied to the image data when a difference between the non-smoothing image data and the smoothing image data is equal to or greater than a threshold value, and the smoothing image data when the difference is smaller than the threshold value; and a storage unit configured to save the image file.

20 Claims, 3 Drawing Sheets

(51) Int. Cl.
*G06T 5/70* (2024.01)
*H04N 1/409* (2006.01)

(56) References Cited

U.S. PATENT DOCUMENTS

| | | |
|---|---|---|
| 8,937,666 B1 | 1/2015 | Padala et al. |
| 9,813,587 B2 * | 11/2017 | Kumagai ............ H04N 1/00206 |
| 2007/0237418 A1 | 10/2007 | Toyoda et al. |
| 2013/0100310 A1 | 4/2013 | Ebihara |
| 2014/0268247 A1 | 9/2014 | Sakaida et al. |
| 2020/0034089 A1 * | 1/2020 | Ito ......................... G06F 3/1247 |

FOREIGN PATENT DOCUMENTS

| | | |
|---|---|---|
| JP | 2012-237874 | 12/2012 |
| JP | 2017-22469 | 1/2017 |

\* cited by examiner

IMAGE PROCESSING DEVICE

CROSS-REFERENCE TO RELATED APPLICATIONS

This application is a Divisional of application Ser. No. 17/842,830 filed on Jun. 17, 2022, the entire contents of which are incorporated herein by reference.

This application is based upon and claims the benefit of priority from Japanese Patent Application No. 2021-111186, filed on Jul. 5, 2021, the entire contents of which are incorporated herein by reference.

FIELD

Embodiments described herein relate to an image processing device.

BACKGROUND

Image reading devices and image forming devices equipped with an auto document feeder (ADF) that is convenient when scanning documents are provided.

DETAILED DESCRIPTION

It is easy to scan a document while transferring the document with an auto document feeder (ADF). However, when various image processes such as smoothing is applied to create a PDF format image file, there are cases where a horizontal streak that is not included in the image before the image process is applied is slightly generated in an image in the file subjected to the image process. When converting the document to PDF, it is necessary to pay attention to such noise, which is troublesome. A problem to be solved by the embodiments described herein is to provide an image processing device capable of removing a horizontal streak that may be shown when a document is scanned and made into a file.

In general, according to one embodiment, an image processing device includes: an image processing unit configured to generate smoothing image data obtained by applying smoothing to image data, and save, as an image file, non-smoothing image data in which smoothing is not applied to the image data when a difference between the non-smoothing image data and the smoothing image data is equal to or greater than a threshold value, and the smoothing image data when the difference is smaller than the threshold value; and a storage unit configured to save the image file.

According to another embodiment, an image processing device includes: an image processing unit configured to save image data as a non-PDF image file which is not in PDF format and a PDF image file which is in PDF format, and enable a user access to the non-PDF image file when a difference between an image obtained by rasterizing the non-PDF image file and an image obtained by rasterizing the PDF image file is equal to or greater than a threshold value, and to the PDF image file when the difference is smaller than the threshold value; and a storage unit configured to save the non-PDF image file and the PDF image file.

Figure 1:
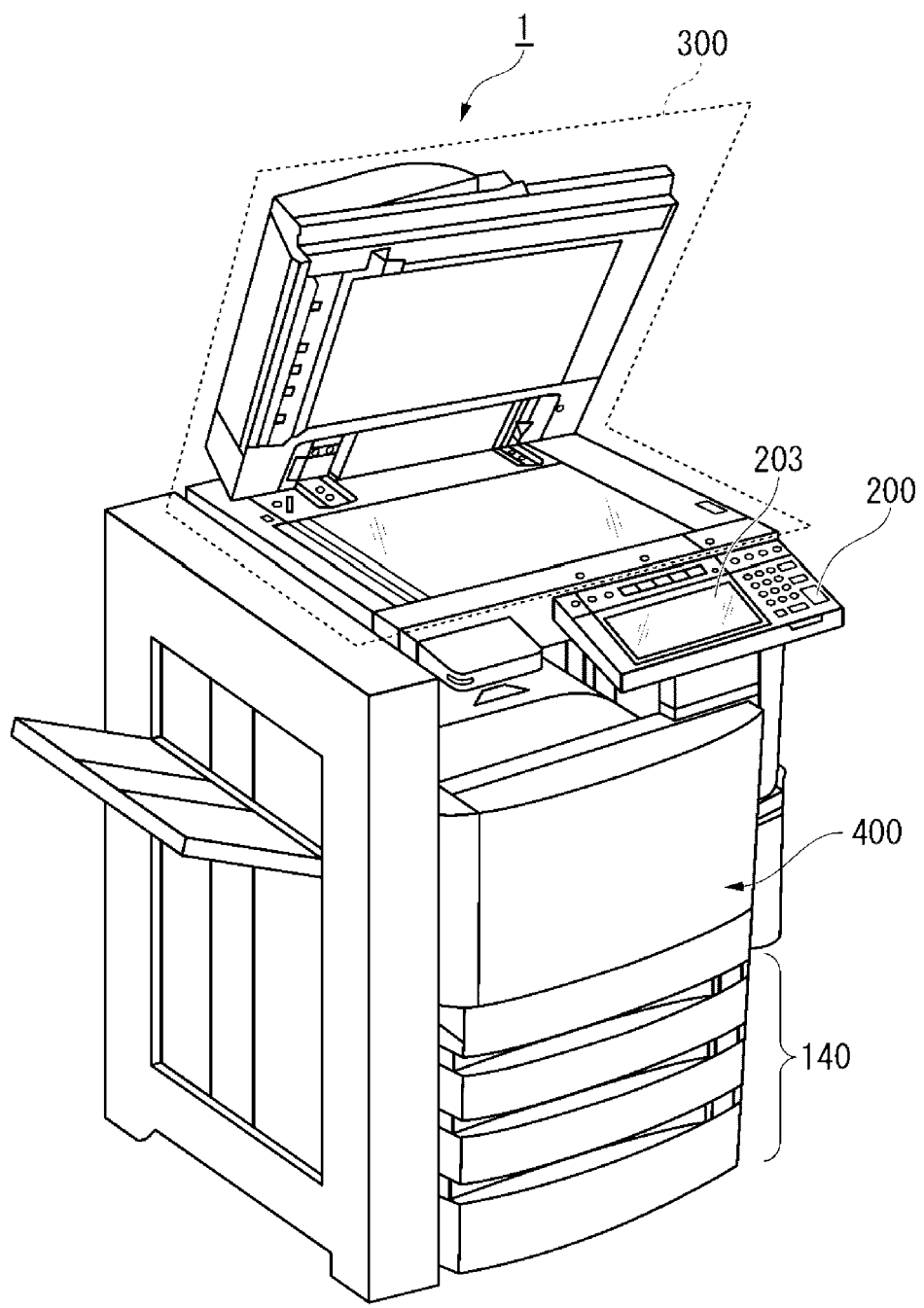
FIG. 1 is an external view showing an overall configuration example of an image forming device 1 according to an embodiment.
Figure 2:
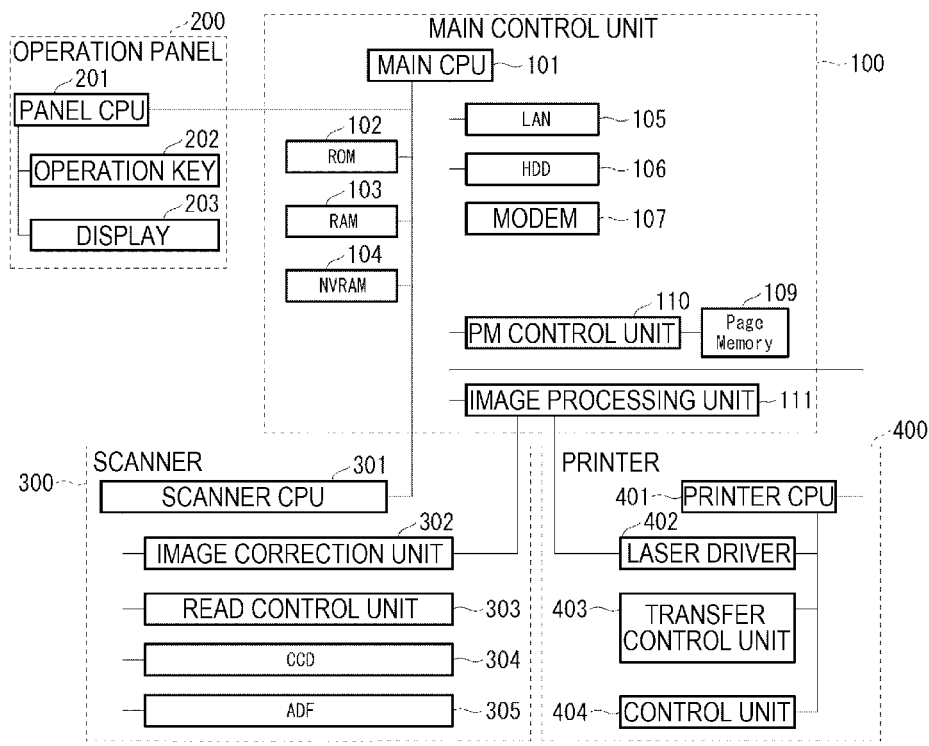
FIG. 2 is a hardware block diagram showing a hardware configuration of the image forming device 1 according to the embodiment.

FIG. 1 is an external view showing an overall configuration example of an image forming device 1 as one embodiment of an image processing device. FIG. 2 is a hardware block diagram showing a hardware configuration of the image forming device 1 according to the embodiment. First, FIG. 1 will be mainly used for explanation. The image forming device 1 is, for example, a multifunction peripheral. The image forming device 1 includes a main control unit 100, a sheet accommodating unit 140, an operation panel 200, a scanner 300, and a printer 400. The image forming device 1 forms an image on a sheet using a developer. The developer is, for example, a toner. In the following description, the developer will be described as the toner. The sheet is, for example, paper or label paper. The sheet may be any sheet as long as the image forming device 1 can form an image on a surface thereof.

The operation panel 200 includes one or a plurality of operation keys 202 and a display 203. The operation panel 200 receives an operation from a user. The operation panel 200 outputs a signal corresponding to the operation performed by the user to the main control unit 100.

The display 203 is an image display device, such as a liquid crystal display or an organic electroluminescence (EL) display. The display 203 displays various kinds of information about the image forming device 1.

The printer 400 forms an image on a sheet based on image data generated by the scanner 300 or image data received via a network. The printer 400 uses toner to form an image. The sheet on which the image is formed may be a sheet accommodated in the sheet accommodating unit 140 or a manually fed sheet. In the following description, forming an image on a sheet is also referred to as printing an image.

The sheet accommodating unit 140 accommodates a sheet to be used for image formation in the printer 400.

The scanner 300 reads an image to be read as luminance of light. The scanner 300 saves the read image data. The saved image data may be transmitted to another information processing device via the network. The image indicated by the saved image data may be formed as an image on the sheet by the printer 400.

Next, FIG. 2 will be mainly used for explanation. In FIG. 2, the image forming device 1 includes the main control unit 100, the operation panel 200, the scanner 300, and the printer 400. The image forming device 1 includes a main CPU 101 in the main control unit 100, a panel CPU 201 of the operation panel 200, a scanner CPU 301 of the scanner 300, and a printer CPU 401 of the printer 400.

The main control unit 100 includes the main CPU 101, an ROM 102, an RAM 103, an NVRAM 104, a network controller 105, an HDD 106, a modem 107, a page memory 109, a page memory (PM) control unit 110, and an image processing unit 111.

The main CPU 101 controls the overall operations of the image forming device 1. The ROM 102 stores data necessary for control such as a control program. The RAM 103 temporarily stores the data. The NVRAM 104 is a non-volatile memory.

The network controller 105 connects the image forming device 1 and the network. The image forming device 1 communicates with an external device such as a server or a personal computer (PC) via the network controller 105. The HDD 106 stores data such as an image used for image formation or an image read by the scanner 300. The HDD 106 is an example of the storage unit. In the image data stored in the HDD 106, a header of the image data read by the scanner 300 includes information indicating reading resolution at the time of reading and recording resolution stored in the HDD 106. The modem 107 connects the image forming device 1 and a telephone line.

The page memory 109 stores image data of a plurality of pages by one page. The page memory control unit 110 controls the page memory 109. The image processing unit 111 performs an image process on the image data. Specific examples of the image process include a color conversion process, a range correction process, a sharpness adjustment process, a gamma correction and halftone process, and a pulse width modulation (PWM) process. The image processing unit 111 may be implemented by using hardware such as an application specific integrated circuit or by software.

The operation panel 200 includes the panel CPU 201, the operation key 202, and the display 203. The panel CPU 201 controls the operation panel 200. The panel CPU 201 is connected to the main CPU 101 by a bus. When the panel CPU 201 receives an instruction regarding display from the main CPU, the panel CPU 201 controls a screen of the display 203 according to the received instruction. When the panel CPU 201 receives numerical values or a process to be executed or setting information from the operation key 202, the panel CPU 201 outputs data indicating the numerical values or the process to be executed or setting information to the main CPU 101. The operation key 202 is an input device for inputting the process to be executed, the setting information, the numerical values, and the like. As a specific example of the information received by the operation key 202, various instructions and settings such as the type (size and orientation) of the sheet on which the image is formed, and the magnification of image formation can be given. The display 203 is a display device such as the liquid crystal display or the organic EL display. The display 203 may be configured as a touch panel.

The scanner 300 includes the scanner CPU 301, an image correction unit 302, a read control unit 303, a charge coupled device (CCD) 304, and an ADF 305. The scanner CPU 301 controls the scanner 300. The image correction unit 302 includes, for example, an A/D conversion circuit, a shading correction circuit, and a line memory. The A/D conversion circuit converts R, G, and B analog signals output from the CCD 304 into digital signals, respectively. The ADF 305 is an automatic document transfer unit. The ADF 305 takes a sheet placed by the user into a transfer path in a transfer direction according to an orientation in which the sheet is placed. The ADF 305 transfers the sheet by rotating a transfer roller in the transfer path, and the CCD 304 reads an image on the sheet being transferred. The CCD 304 can also read an image on a sheet placed stationary on the scanner 300.

The printer 400 includes the printer CPU 401, a laser driver 402, a transfer control unit 403, and a control unit 404. The printer CPU 401 controls the printer 400. The laser driver 402 drives the laser to form an electrostatic latent image on a photoconductor. The transfer control unit 403 transfers a sheet to be image-formed. The control unit 404 forms an image on the sheet transferred by the transfer control unit 403 by controlling a device such as the laser driver 402.

Figure 3:
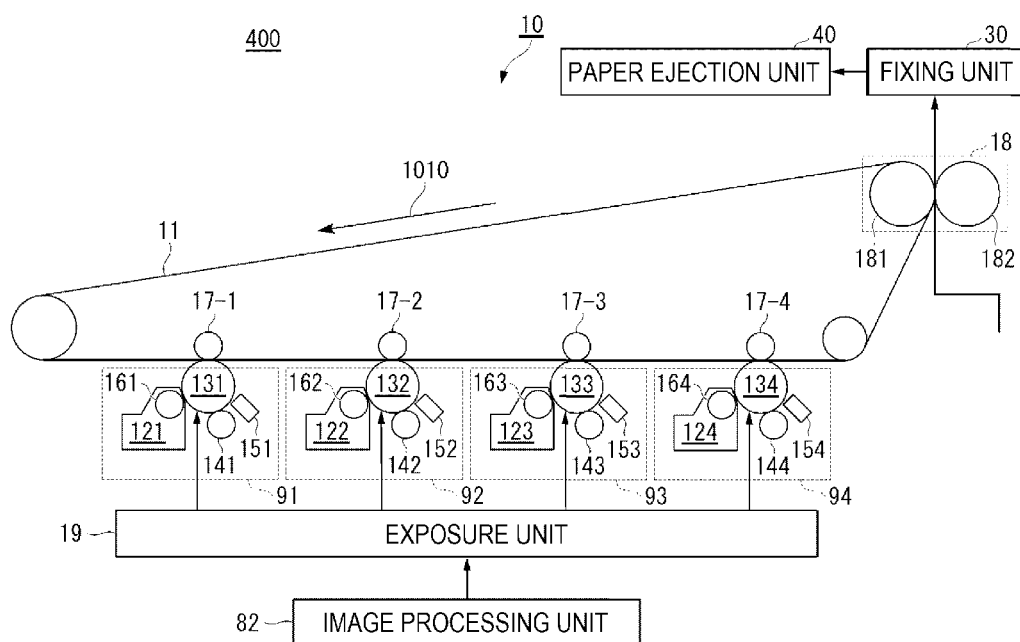
FIG. 3 is a diagram showing an example of an internal configuration of a printer 400.

FIG. 3 is a diagram showing an example of an internal configuration of the printer 400. In the example of FIG. 3, the printer 400 is a quadruple tandem type printer. However, the printer 400 does not have to be limited to the quadruple tandem type.

The printer 400 includes an image forming unit 10, a fixing unit 30, and a paper ejection unit 40. The image forming unit 10 includes an intermediate transfer body 11, developing devices 91 to 94, a plurality of primary transfer rollers 17 (17-1 to 17-4), a secondary transfer unit 18, and an exposure unit 19.

The intermediate transfer body 11 may be implemented by using, for example, an endless belt. The intermediate transfer body 11 is rotated in the direction of an arrow 1010 by the rollers. In this embodiment, upstream and downstream are defined based on the direction in which the intermediate transfer body 11 moves. A visible image generated by the developing devices 91 to 94 is transferred to a surface of the intermediate transfer body 11.

The developing devices 91 to 94 form the visible image using toners having different properties. For example, in some developing devices, toners having different colors may be used. As the toners having different colors, toners of colors of yellow (Y), magenta (M), cyan (C) and black (K) may be used. In some developing devices, toner whose color disappears due to an external stimulus (for example, heat) may be used. In some developing devices, special toners such as glossy toners and fluorescent toners may be used.

In FIG. 3, the developing device 91 is located most upstream among the four developing devices, and the developing device 94 is located most downstream among the four developing devices.

The developing devices 91 to 94 differ in the properties of the toner used, but have the same configuration. The developing device 91 includes a developing unit 121, a photoconductor drum 131, a charger 141, a cleaning blade 151, and a developing drum 161. The developing device 92 includes a developing unit 122, a photoconductor drum 132, a charger 142, a cleaning blade 152, and a developing drum 162. The developing device 93 includes a developing unit 123, a photoconductor drum 133, a charger 143, a cleaning blade 153, and a developing drum 163. The developing device 94 includes a developing unit 124, a photoconductor drum 134, a charger 144, a cleaning blade 154, and a developing drum 164.

In the following description, if the developing unit 121, developing unit 122, developing unit 123, and developing unit 124 are not particularly distinguished, it is expressed as the developing unit 12. The same applies to the photoconductor drum 13, the charger 14, the cleaning blade 15, and the developing drum 16.

Hereinafter, the developing device will be described by taking the developing device 91 as an example. The developing device 91 includes the developing unit 121, the photoconductor drum 131, the charger 141, the cleaning blade 151, and the developing drum 161. The developing unit 121 accommodates the toner and a carrier. The developing unit 121 attaches the toner to the photoconductor drum 131 by the developing drum 161.

The photoconductor drum 131 has a photoconductor (photosensitive region) on an outer peripheral surface. The photoconductor is, for example, an organic photoconductor (OPC). The photoconductor drum 131 is exposed by the exposure unit 19, and the electrostatic latent image is formed on the surface of the photoconductor drum 131. The charger 141 uniformly the of the charges surface photoconductor drum 131.

The cleaning blade 151 is, for example, a plate-shaped member. The cleaning blade 151 is made of rubber such as urethane resin, for example. The cleaning blade 151 removes the toner adhering to the photoconductor drum 131.

Next, operations of the developing device 91 will be described. The photoconductor drum 131 is charged to a predetermined potential by the charger 141. Next, the exposure unit 19 irradiates the photoconductor drum 131 with light. As a result, the potential of a region irradiated with the light in the photoconductor drum 131 changes. Due to this change, an electrostatic latent image is formed on the surface of the photoconductor drum 131. The electrostatic latent image on the surface of the photoconductor drum 131 is developed by the toner of the developing unit 121. That is, the visible image, which is an image developed by the toner, is formed on the surface of the photoconductor drum 131.

The primary transfer rollers 17 (17-1 to 17-4) transfer the visible image formed on the photoconductor drums by the developing devices 91 to 94 to the intermediate transfer body 11. The secondary transfer unit 18 including a secondary transfer roller 181 and a secondary transfer counter roller 182 collectively transfers the visible image formed on the intermediate transfer body 11 to the sheet to be image-formed. The transfer by the secondary transfer unit 18 is implemented by, for example, a potential difference between the secondary transfer roller 181 and the secondary transfer counter roller 182.

The exposure unit 19 forms the electrostatic latent image by irradiating the photoconductor drums of the developing devices 91 to 94 with light. The exposure unit 19 includes a light source such as a laser or a light emitting diode (LED). In this embodiment, the exposure unit 19 includes a laser and operates according to the control of the laser driver 402.

The fixing unit 30 fixes the visible image on the sheet by heating and pressurizing the visible image transferred onto the sheet. The paper ejection unit 40 ejects the sheet on which the visible image is fixed by the fixing unit 30 to the outside of the image forming device 1.

If the sheet is scanned and various image processes such as smoothing is applied to make an image file in PDF format, there are cases where a horizontal streak that is not included in the image before the image process is applied is slightly generated in the image in the file subjected to the image process. Smoothing functions and PDF specification versions are considered to be one of the causes of a horizontal streak.

A first embodiment for removing a horizontal streak will be described. Non-smoothing image data in which smoothing is not applied to image data obtained by scanning a sheet, and smoothing image data in which the smoothing is applied to the image data obtained by scanning the sheet are generated.

A comparison is made between the non-smoothing image data and the smoothing image data. The comparison is, for example, a density comparison. The density comparison is performed to figure out whether the density for each pixel differs by a value equal to or greater than a threshold value. Alternatively, it is compared whether or not the densities differ by a value equal to or greater than a threshold value in block units with a plurality of pixels as a block. Alternatively, it is compared whether or not an average density of the entire image data differs by a value equal to or greater than a threshold value. The comparison is, for example, a comparison by image recognition. It is compared whether there is an object such as a line and a drawing obtained by the image recognition, and whether positions, shapes, and postures differ by a value equal to or greater than a threshold value.

If no significant difference is found as a result of comparing the non-smoothing image data and the smoothing image data, the smoothing image data is adopted as the data to be converted into an image file. If a significant difference is found as a result of comparing the non-smoothing image data and the smoothing image data, the non-smoothing image data is adopted instead of the smoothing image data as the data to be converted into the image file. The non-smoothing image data of a pixel at a position where the significant difference is found and the smoothing image data of a pixel at a position where no significant difference is found may be selectively adopted in pixel units. The non-smoothing image data of a block at a position where the significant difference is found and the smoothing image data of a block at a position where no significant difference is found may be selectively adopted in pixel units.

The image file is created by applying a process to part or all of the adopted image data to reduce blurring of characters, adjust contrast, or the like. When only a part of the adopted image data is subjected to the process of reducing the blurring of characters, and adjusting contrast, or the like to create the image file, information indicating where the part locates may be included in the image file as text, images, or metadata. When only a part of the adopted image data is subjected to the process of reducing the blurring of characters, and adjusting contrast, or the like to create the image file, the information indicating where the part locates may be displayed on the display 203 of the operation panel 200.

A second embodiment for removing a horizontal streak will be described. The image data obtained by scanning the sheet is saved in a non-PDF image file that is not in PDF format and a PDF image file that is in PDF format.

An image obtained by rasterizing the non-PDF image file and an image obtained by rasterizing the PDF image file are compared. The comparison is, for example, a color density comparison. The comparison is, for example, performed by image recognition.

If no significant difference is found as a result of comparing the image obtained by rasterizing the non-PDF image file and the image obtained by rasterizing the PDF image file, the PDF image file is adopted. If a significant difference is found as a result of comparing the image obtained by rasterizing the non-PDF image file and the image obtained by rasterizing the PDF image file, the non-PDF image file is adopted instead of the PDF image file.

A user access is allowed to the PDF image file to be adopted or the non-PDF image file to be adopted. Allowing the user access to the file to be adopted is performed by, for example, displaying the PDF image file to be adopted or the non-PDF image file to be adopted as an option on the operation panel 200. Allowing the user access to the file to be adopted is performed by, for example, attaching the file to be adopted to the Email transmitted in a so-called ScanToEmail operation. The file that is not adopted may be deleted, or the user may be allowed to access the file that is not adopted by a method different from the access to the file to be adopted.

Information indicating whether the PDF image file is adopted or the non-PDF image file is adopted may be displayed on the display 203 of the operation panel 200.

Displaying the information indicating whether the PDF image file is adopted or the non-PDF image file is adopted is performed by, for example, displaying "since noise appears in the file image in PDF format, it is saved as a file in XX format" when the non-PDF image file is adopted.

A part of or the entire adopted image file may be subjected to the process of reducing the blurring of characters, adjusting contrast, or the like. When only a part of the adopted image file is subjected to the process of reducing the blurring of characters, adjusting contrast, or the like, the information indicating where the part locates may be included in the image file as text, images, or metadata. When only a part of the adopted image file is subjected to the process of reducing the blurring of characters, adjusting contrast, or the like, the information indicating where the part locates may be displayed on the display 203 of the operation panel 200.

Figure 4:
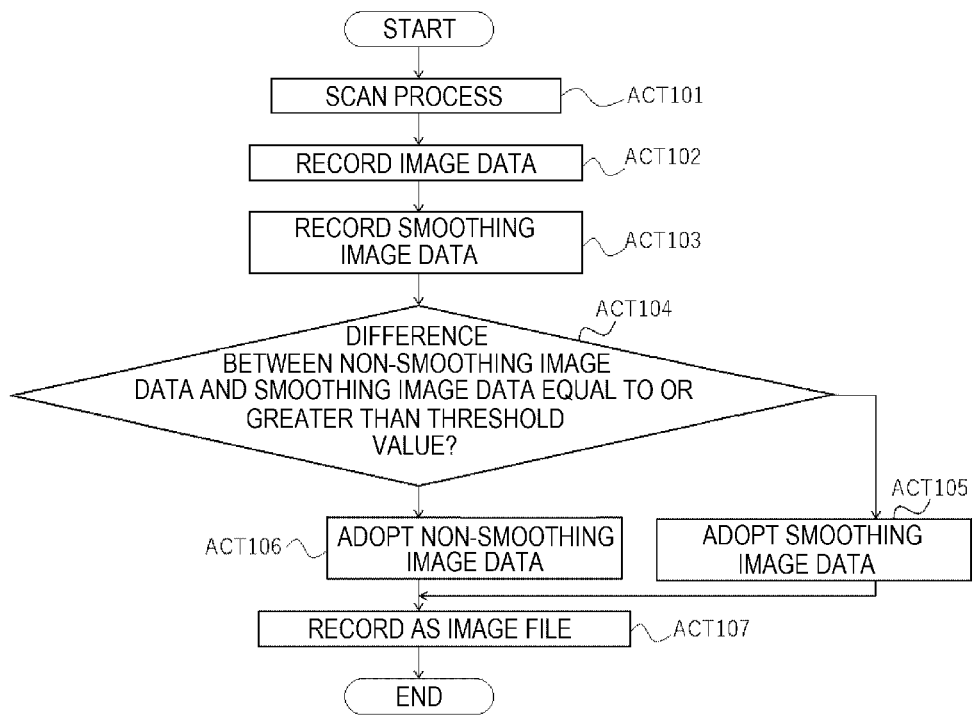
FIG. 4 is a flowchart showing a processing flow as a first embodiment of scanning a sheet to obtain image data and converting the image data into a file.

The process described above will be described using a flowchart. FIG. 4 is a flowchart showing a processing flow as the first embodiment of scanning the sheet to obtain the image data and converting the image data into the file. The scanner 300 performs a scan process (ACT 101). The image data obtained by the scanning process is stored in the page memory 109. The image processing unit 111 performs the image process on the image data stored in the page memory 109, and saves the image data in the HDD 106 (ACT 102).

The image processing unit 111 generates the smoothing image data obtained by applying smoothing to the non-smoothing image data which is the image data stored in the HDD 106, and stores the smoothing image data in the HDD 106 (ACT 103). The image processing unit 111 compares the non-smoothing image data with the smoothing image data (ACT 104). If the difference between the non-smoothing image data and the smoothing image data is smaller than the threshold value (ACT 104: NO), the image processing unit 111 adopts the smoothing image data as the data to be converted into the image file (ACT 105). If the difference between the non-smoothing image data and the smoothing image data is equal to or greater than the threshold value (ACT 104: YES), the image processing unit 111 adopts the non-smoothing image data as the data to be converted into the image file (ACT 106). The image processing unit 111 performs a process to reduce the blurring of characters, or adjusts the contrast, and the like on the adopted image data, saves the adopted image data in the HDD 106 as the image file (ACT 107), and ends the process. In a case of a copy process, the printer 400 may form an image on a sheet based on the image file saved in the HDD 106.

Figure 5:
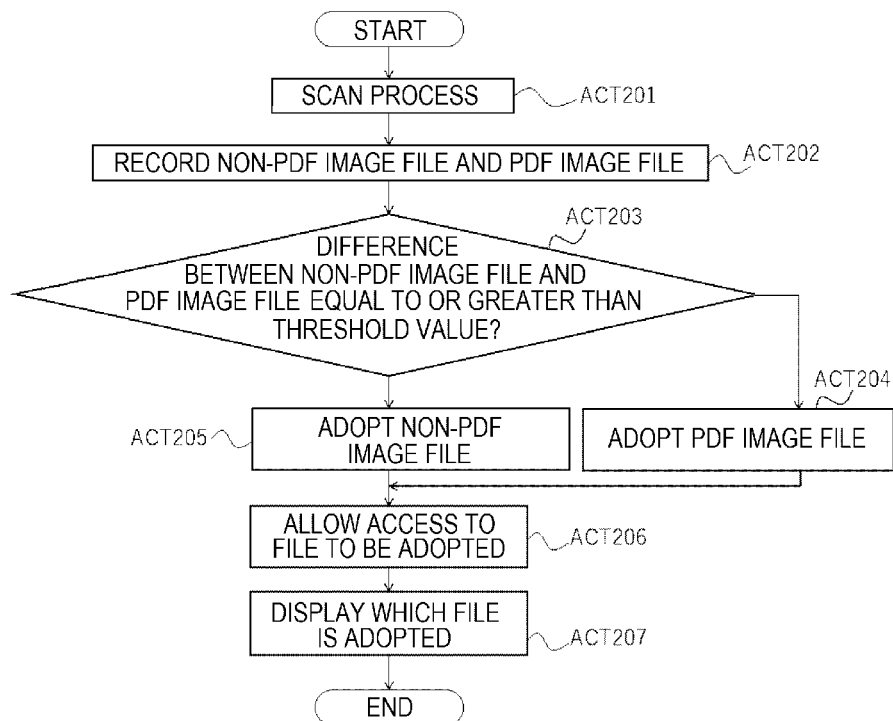
FIG. 5 is a flowchart showing a processing flow as a second embodiment of scanning a sheet to obtain image data and converting the image data into a file.

FIG. 5 is a flowchart showing a processing flow as the second embodiment of scanning the sheet to obtain the image data and converting the image data into the file. The scanner 300 performs the scan process (ACT 201). The image data obtained by the scanning process is stored in the page memory 109. The image processing unit 111 performs an image process on the image data stored in the page memory 109, and stores as the non-PDF image file which is not in the PDF format and the PDF image file which is in the PDF format in the HDD 106 (ACT 202).

The image processing unit 111 compares the non-PDF image file with the PDF image file (ACT 203). If the difference between the non-PDF image file and the PDF image file is smaller than the threshold value (ACT 203: NO), the image processing unit 111 adopts the PDF image file (ACT 204). If the difference between the non-PDF image file and the PDF image file is equal to or greater than the threshold value (ACT 203: YES), the image processing unit 111 adopts the non-PDF image file instead of the PDF image file (ACT 205).

The image processing unit 111 enables the user to access the PDF image file to be adopted or the non-PDF image file to be adopted (ACT 206). The main CPU 101 displays the information indicating whether the PDF image file is adopted or the non-PDF image file is adopted on the display 203 of the operation panel 200 (ACT 207), and ends the process.

In the embodiments described above, the main CPU 101 and the image processing unit 111 may be mounted on the same processor. The above embodiments may be configured as an image processing device that does not include the printer 400. The above embodiments may be configured such that the image processing device is not provided with the scanner 300, and the scanner 300 that communicates via the network controller 105 of the image processing device performs the scanning process to obtain image data.

The functions of the image processing device and the image forming device in the above embodiments may be implemented by a computer. In that case, a program for implementing the functions may be recorded on a computer-readable recording medium, and the program recorded on the recording medium may be read by a computer system and executed. The "computer system" mentioned here includes an OS and hardware such as peripheral devices. The "computer-readable recording medium" refers to a storage device such as a portable medium such as a flexible disk, a magneto-optical disk, a ROM, and a CD-ROM, and a hard disk built in the computer system. The "computer-readable recording medium" may include a recording medium that retains a program dynamically in a short time, such as a communication line for transmitting a program via a network such as the Internet or a communication line such as a telephone line, or a recording medium that retains a program for a predetermined time, such as a volatile memory in a computer system serving as a server or a client in this case. The program may be used to implement a part of the above functions, and combine with a program that is already saved in the computer system to implement the above functions.

While certain embodiments are described, these embodiments are presented as examples and are not intended to limit the scope of the exemplary embodiments described herein. These embodiments can be implemented in other various forms, and various omissions, replacements, and changes can be made without departing from the spirit of the exemplary embodiments of the disclosure described herein. The accompanying claims and their equivalents are intended to cover these embodiments or modifications as would fall within the scope and spirit of the exemplary embodiments described herein.

What is claimed is:

1. An image processing device, comprising:
   an image processing component configured to save image data as a non-PDF image file which is not in PDF format and a PDF image file which is in PDF format, and enable a user access to the non-PDF image file when a difference between an image obtained by rasterizing the non-PDF image file and an image obtained by rasterizing the PDF image file is equal to or greater than a threshold value, and to the PDF image file when the difference between an image obtained by rasterizing the non-PDF image file and an image obtained by rasterizing the PDF image file is smaller than the threshold value; and
   a storage component configured to save the non-PDF image file and the PDF image file.

2. The image processing device according to claim 1, further comprising:
a scanner configured to scan a sheet to obtain the image data.

3. The image processing device according to claim 1, wherein
the image processing component is configured to, when the difference between the image obtained by rasterizing the non-PDF image file and the image obtained by rasterizing the PDF image file is equal to or greater than the threshold value, perform an image process on the non-smoothing image data to save as the image file, and when the difference between the image obtained by rasterizing the non-PDF image file and the image obtained by rasterizing the PDF image file is smaller than the threshold value, perform the image process on the smoothing image data to store as the image file.

4. The image processing device according to claim 1, further comprising:
a printer configured to form an image on a sheet based on the saved PDF image file.

5. The image processing device according to claim 1, wherein
the difference between the image obtained by rasterizing the non-PDF image file and the image obtained by rasterizing the PDF image file is determined by density comparison comprising determining whether a density for each pixel differs by a value equal to or greater than a threshold value.

6. The image processing device according to claim 1, wherein
the difference between the image obtained by rasterizing the non-PDF image file and the image obtained by rasterizing the PDF image file is determined by density comparison comprising determining whether or not densities differ by a value equal to or greater than a threshold value in block units with a plurality of pixels as a block.

7. The image processing device according to claim 1, wherein
the difference between the image obtained by rasterizing the non-PDF image file and the image obtained by rasterizing the PDF image file is determined by density comparison comprising determining whether or not an average density of an entire image data differs by a value equal to or greater than a threshold value.

8. A method of preventing or reducing horizontal streaks in a scanning operation, comprising:
saving image data as a non-PDF image file which is not in PDF format and a PDF image file which is in PDF format;
enabling a user access to the non-PDF image file when a difference between an image obtained by rasterizing the non-PDF image file and an image obtained by rasterizing the PDF image file is equal to or greater than a threshold value, and to the PDF image file when the difference between an image obtained by rasterizing the non-PDF image file and an image obtained by rasterizing the PDF image file is smaller than the threshold value; and
saving the non-PDF image file and the PDF image file.

9. The method according to claim 8, further comprising:
scanning a sheet to obtain the image data.

10. The method according to claim 8, further comprising:
when the difference between the image obtained by rasterizing the non-PDF image file and the image obtained by rasterizing the PDF image file is equal to or greater than the threshold value, performing an image process on the non-smoothing image data to save as the image file, and when the difference between the image obtained by rasterizing the non-PDF image file and the image obtained by rasterizing the PDF image file is smaller than the threshold value, performing the image process on the smoothing image data to store as the image file.

11. The method according to claim 8, further comprising:
forming an image on a sheet based on the saved PDF image file.

12. The method according to claim 8, wherein
the difference between the image obtained by rasterizing the non-PDF image file and the image obtained by rasterizing the PDF image file is determined by density comparison comprising determining whether a density for each pixel differs by a value equal to or greater than a threshold value.

13. The method according to claim 8, wherein
the difference between the image obtained by rasterizing the non-PDF image file and the image obtained by rasterizing the PDF image file is determined by density comparison comprising determining whether or not densities differ by a value equal to or greater than a threshold value in block units with a plurality of pixels as a block.

14. The method according to claim 8, wherein
the difference between the image obtained by rasterizing the non-PDF image file and the image obtained by rasterizing the PDF image file is determined by density comparison comprising determining whether or not an average density of an entire image data differs by a value equal to or greater than a threshold value.

15. A multifunction peripheral, comprising:
a scanner;
a printer;
an image processing component configured to save image data as a non-PDF image file which is not in PDF format and a PDF image file which is in PDF format, and enable a user access to the non-PDF image file when a difference between an image obtained by rasterizing the non-PDF image file and an image obtained by rasterizing the PDF image file is equal to or greater than a threshold value, and to the PDF image file when the difference between an image obtained by rasterizing the non-PDF image file and an image obtained by rasterizing the PDF image file is smaller than the threshold value; and
a storage component configured to save the non-PDF image file and the PDF image file.

16. The multifunction peripheral according to claim 15, further comprising:
a developing device comprising a developing component, a photoconductor drum, a charger, a cleaning blade, and a developing drum.

17. The multifunction peripheral according to claim 15, wherein
the image processing component is configured to, when the difference between the image obtained by rasterizing the non-PDF image file and the image obtained by rasterizing the PDF image file is equal to or greater than the threshold value, perform an image process on the non-smoothing image data to save as the image file, and when the difference between the image obtained by rasterizing the non-PDF image file and the image obtained by rasterizing the PDF image file is smaller than the threshold value, perform the image process on the smoothing image data to store as the image file.

18. The multifunction peripheral according to claim 15, wherein
the difference between the image obtained by rasterizing the non-PDF image file and the image obtained by rasterizing the PDF image file is determined by density comparison comprising determining whether a density for each pixel differs by a value equal to or greater than a threshold value.

19. The multifunction peripheral according to claim 15, wherein
the difference between the image obtained by rasterizing the non-PDF image file and the image obtained by rasterizing the PDF image file is determined by density comparison comprising determining whether or not densities differ by a value equal to or greater than a threshold value in block units with a plurality of pixels as a block.

20. The multifunction peripheral according to claim 15, wherein
the difference between the image obtained by rasterizing the non-PDF image file and the image obtained by rasterizing the PDF image file is determined by density comparison comprising determining whether or not an average density of an entire image data differs by a value equal to or greater than a threshold value.

* * * * *